April 3, 1928. 1,665,067
J. W. MEADOWCROFT
ELECTRIC WELDING MACHINE
Filed March 7, 1927 6 Sheets-Sheet 1

INVENTOR.
JOSEPH W. MEADOWCROFT
BY John P. Tarbox
ATTORNEY.

April 3, 1928.

J. W. MEADOWCROFT

ELECTRIC WELDING MACHINE

Filed March 7, 1927

INVENTOR.
JOSEPH W. MEADOWCROFT
BY John P. Larbor
ATTORNEY.

April 3, 1928.

J. W. MEADOWCROFT

ELECTRIC WELDING MACHINE

Filed March 7, 1927

INVENTOR.
JOSEPH W. MEADOWCROFT
BY John P. Tarbox
ATTORNEY.

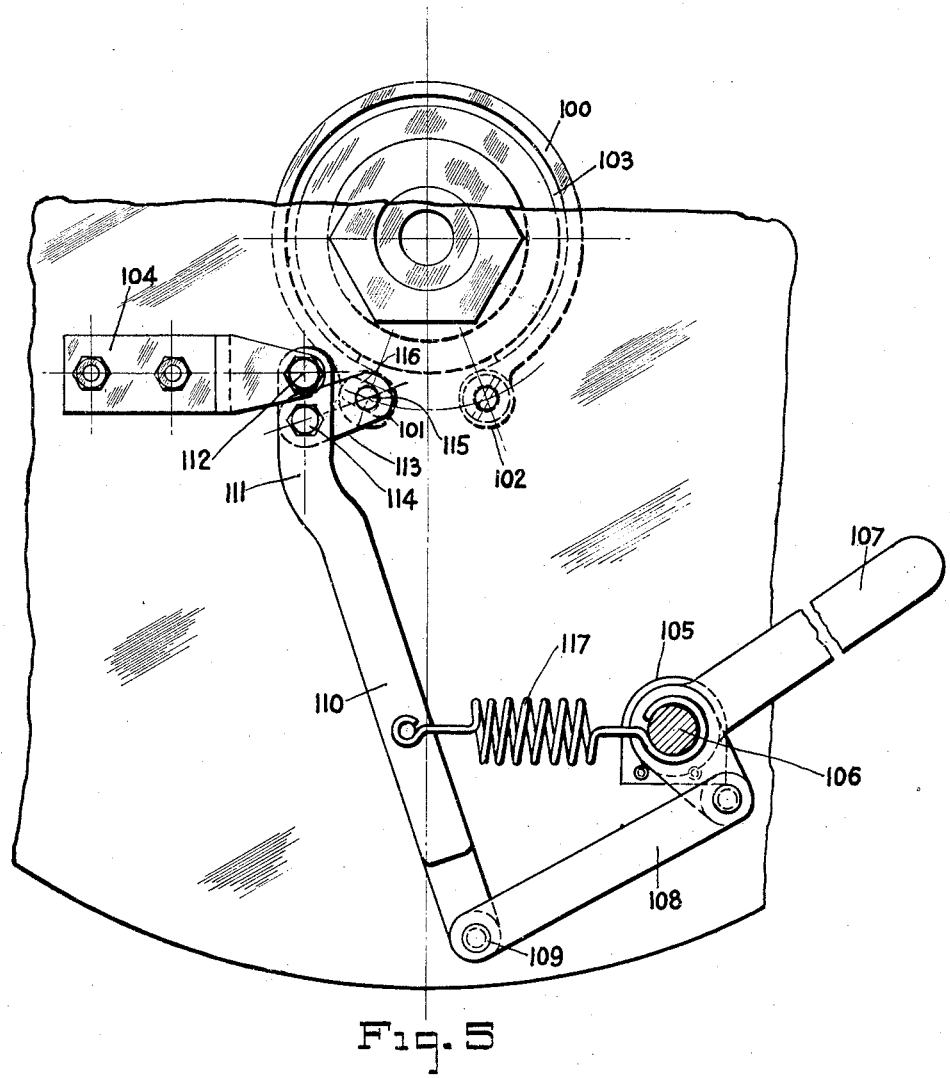

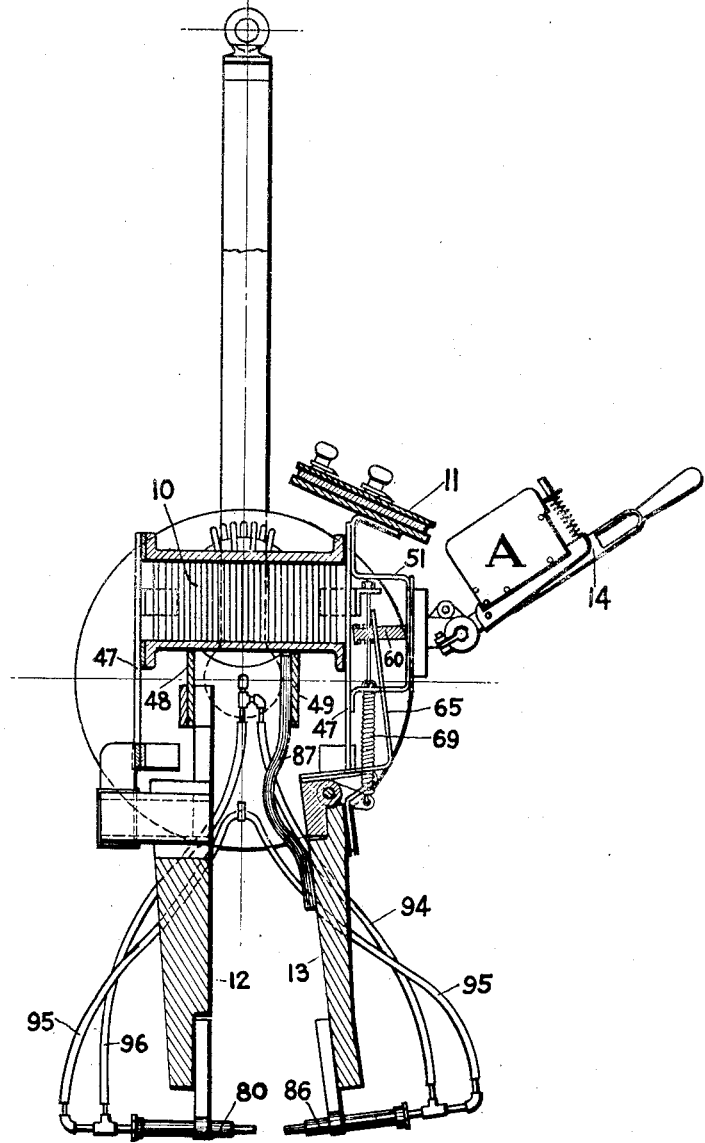

Patented Apr. 3, 1928.

1,665,067

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRIC WELDING MACHINE.

Application filed March 7, 1927. Serial No. 173,329.

This invention relates to electric welding machines and more particularly to machines for electrically spot welding together sheet metal panels and other such structural parts.

In the manufacture of all metal automobile bodies, especially, it has been found advisable, both in the interests of increasing the speed of production as well as the economy of manufacture, to assemble the various sheet metal panels and stampings which make up the complete body by electrically welding them together. The method of welding most generally employed is spot welding wherein the panels or structural parts to be welded together are compressed between electrodes of comparatively small contact area and a current of electricity is passed through the electrodes. Difficulties have been encountered from time to time, however, in spot welding the parts together, due to the fact that a number of the joints to be welded are often inaccessible to the ordinary spot welding machine. Also it is often impractical to shift the work around the machine so as to bring the joint which is to be welded into proper position with respect to the welding electrodes.

It is among the special and principal objects of this invention to provide an electric spot welding mechanism which is designed to permit the formation of spot welds in places which have been hitherto considered inaccessible for this type of weld.

Still another object of the invention is the provision of a spot welding machine which may be employed to effect spot welds irrespective of the position or the location of the joint to be welded.

A still further object of the invention is the provision of a spot welding machine which may be adjusted with respect to the work to be welded, this adjustment being characterized by the shifting of the welding axis from one position to another as may be desired. In furtherance of this last mentioned object, the machine is so designed that it is capable of a substantially universal adjustment with respect to the work to be welded.

A still further object of the invention is the provision of a spot welding machine which is as compact and rugged in construction as it is efficient and simple in operation.

A still further object of the invention is to provide a spot welding machine which is not only adjustable for various angular positions but which is also portable, thus greatly increasing the facility and ease with which the machine may be handled for effecting those welds which have been heretofore considered difficult, if not altogether impossible.

Other objects of the invention will appear more fully hereinafter.

The invention consists substantially of a construction, combination, location and relative arrangement of parts, all as will be more fully hereinafter set forth, as shown in the accompanying drawings, and finally pointed out in the appended claims.

In the accompanying drawings—

Figure 5 is an enlarged view showing a portion of one of the outer plates and a brake mechanism associated therewith;

Figure 6 is a view similar to Figure 2 but showing the entire machine; and

The same part is designated by the same reference numeral wherever it occurs throughout the several views.

Figure 1:
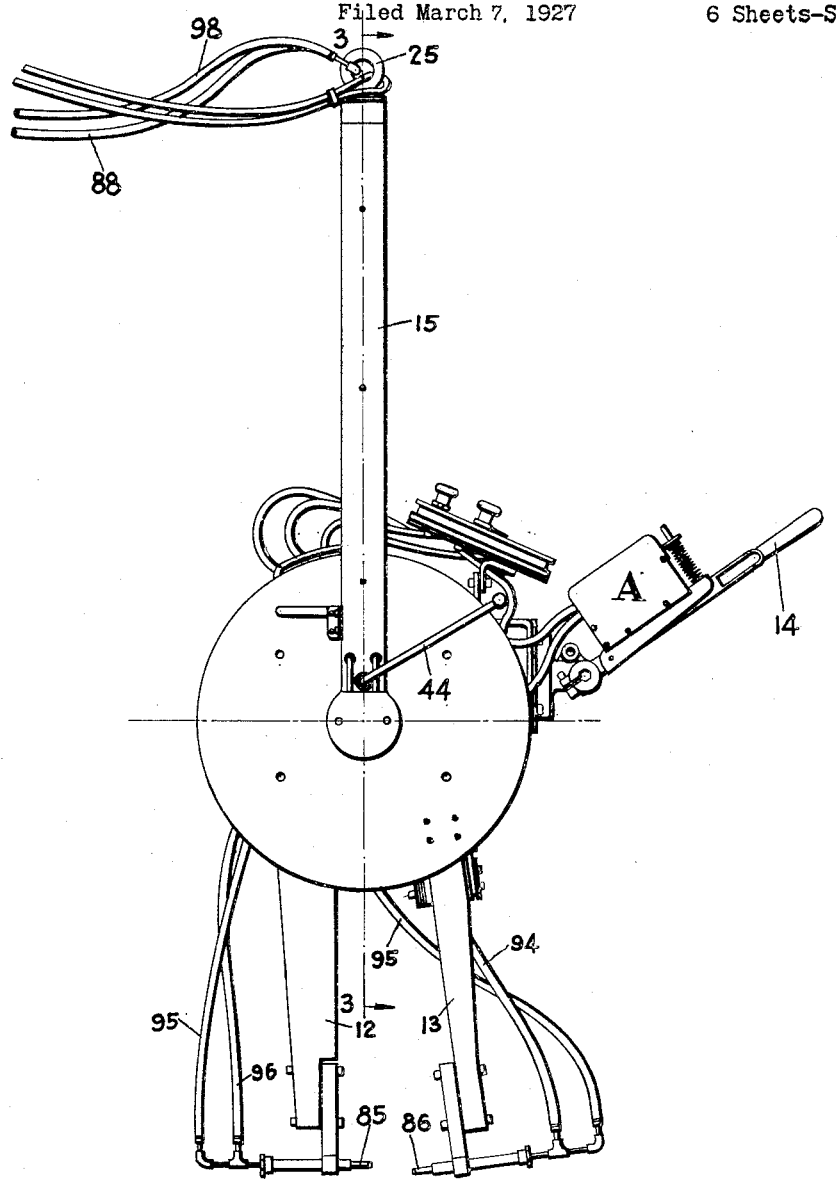
Figure 1 is a side elevation of the complete machine.

Referring more particularly to the drawings, it will be seen that the welding machine essentially consists of a transformer indicated generally by the reference numeral 10, a controlling rheostat 11, and a pair of electrode supporting arms 12 and 13, the arm 13 being arranged for movement toward and away from the relatively stationary arm 12. An actuating arm 14 is operatively associated with the relatively movable electrode supporting arm 13 in the manner described more fully hereinafter, this actuating arm being provided with the usual switch mechanism designated generally by the reference numeral A for opening and closing the primary circuit of the transformer 10.

Figures 3, 7:
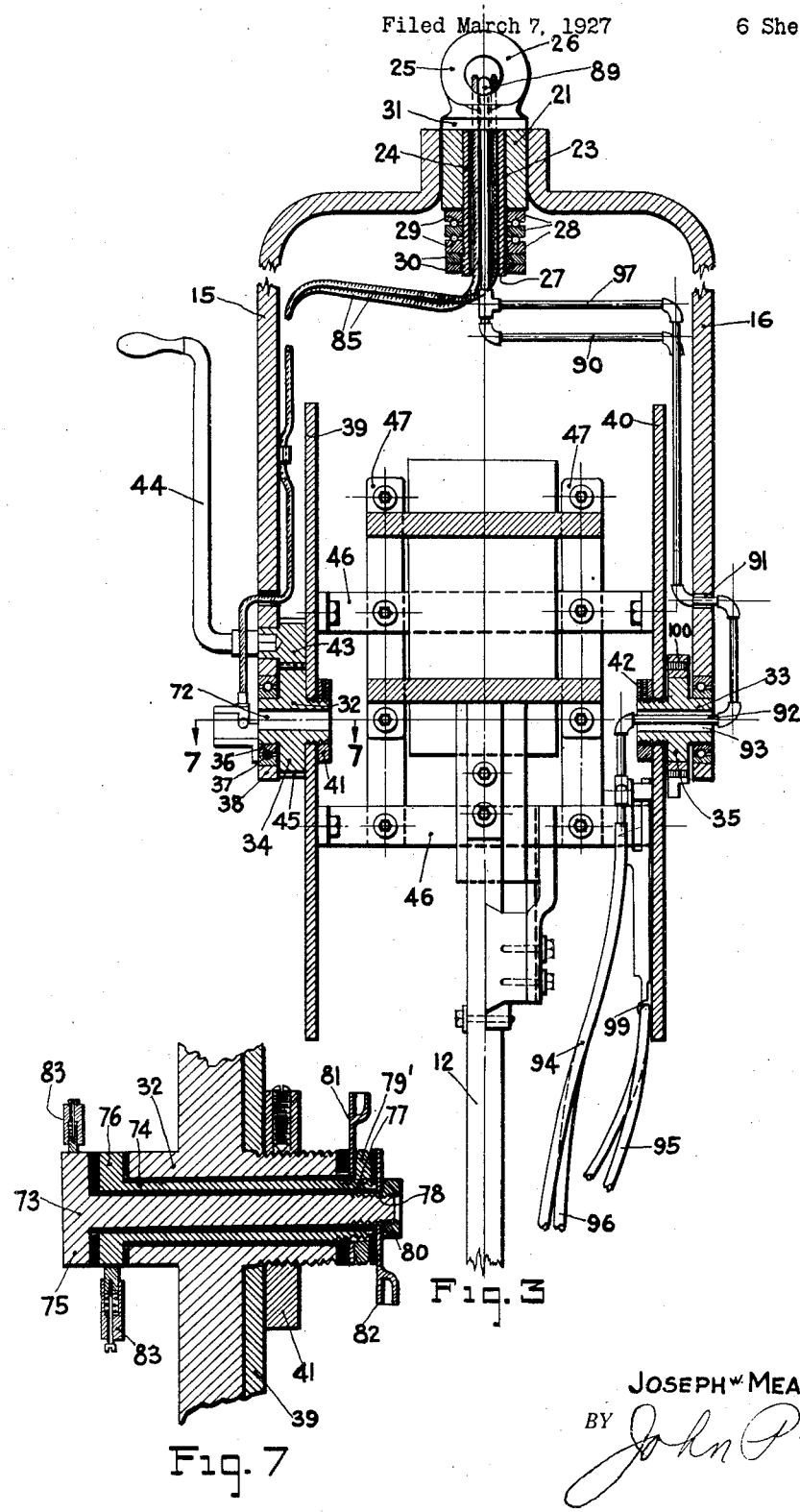
Figure 3 is a cross sectional view taken on line 3—3 of Figure 1.
Figure 7 is an enlarged view in cross section, taken on the line 7—7 of Figure 3.
Figure 4:
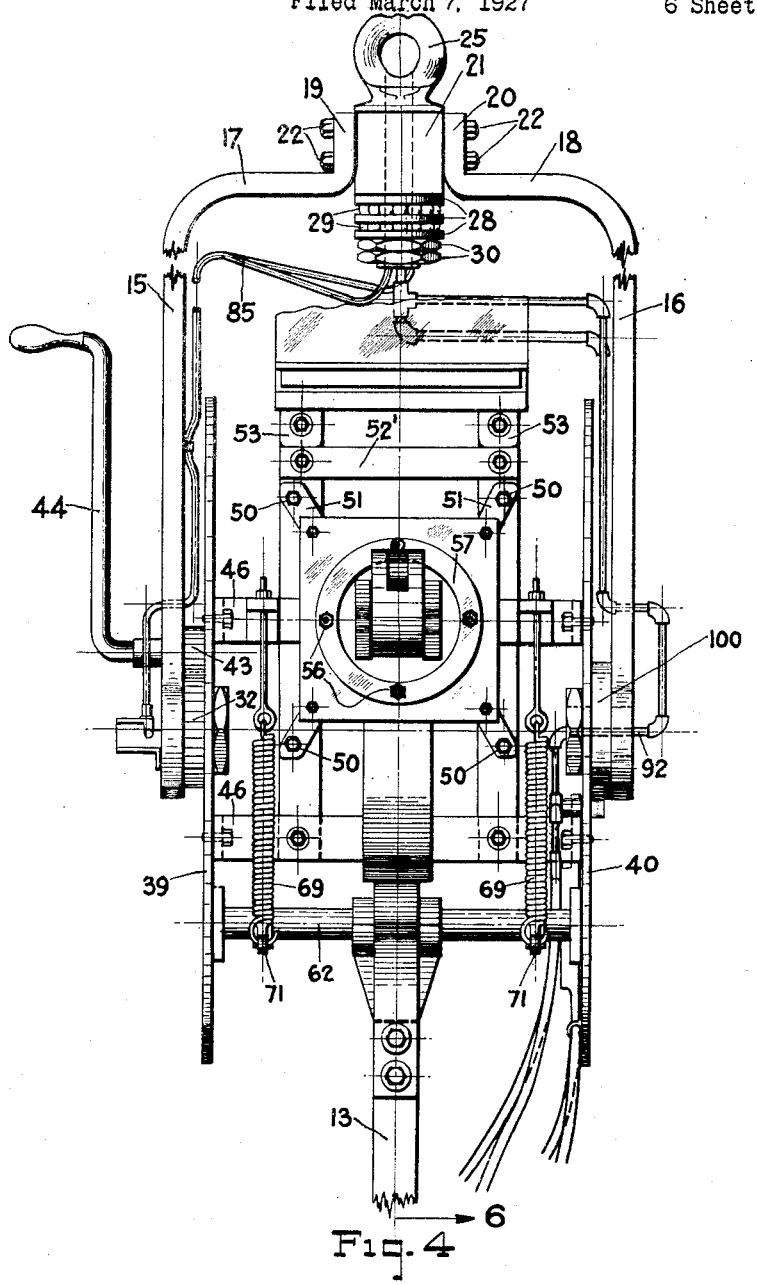
Figure 4 is a front elevation of the machine, the actuating arm of the machine being omitted in this figure.

As shown in Figures 3 and 4, the welding apparatus is provided with a pair of supporting brackets 15 and 16 each of substantially inverted L shape, and the upper horizontally extending portions 17 and 18 thereof being turned upwardly at their free ends as at 19 and 20, respectively. These upturned portions 19 and 20 of the supporting brackets embrace the opposite faces of an intermediately disposed member 21 and are secured thereto by means of a plurality of bolts 22, the arrangement being such that when the brackets 15 and 16 are joined together through the member 21 there is provided in effect a supporting yoke for the welding mechanism proper which is substantially in the shape of an inverted U. This is most clearly shown in Figures 3 and 4.

The member 21 is provided with a vertically extending bore 23, through which extends the stem 24 of a supporting member 25. This supporting member 25 is suitably formed at its upper end for engagement over a hook or other such supporting device, the preferred form being that of an eye such as indicated by the reference numeral 26. The member 25 is further provided with a vertically extending bore 27 extending throughout the entire length of the stem 24 and communicating with the central opening in the eye 26. The U shaped supporting yoke comprising the brackets 15 and 16 and the member 21 is rotatably supported upon the stem 24 of the supporting member 25 by means of a plurality of ball bearing races 28 suitably embracing the ball bearings 29, these ball bearing races 28 being slipped over that portion of the stem 24 which projects through the bottom of the member 21. Nuts 30 are threaded upon the lower end of the stem 24, these nuts constituting the bottom abutment for the ball bearing races 28. These nuts further cooperate with an enlarged shoulder 31 on the supporting member 25 for preventing any relative vertical movement between the U shaped supporting yoke and its supporting member 25 without, however, interfering with any relative rotation therebetween.

Mounted within suitable apertures in the lower ends of the arms 15 and 16 of the supporting yoke are a pair of inwardly presenting stub shafts 32 and 33, respectively. In each instance the opposite ends of the stub shafts 32 and 33 are substantially reduced in cross section, so as to provide enlarged central portions 34 and 35, respectively, forming outer and inner annular shoulders. The outer ends of the stub shafts are of substantially circular cross section and have fixed thereto bearing races 36 which are arranged to rotate freely within the cooperating bearing races 37 located within the apertures in the lower ends of the arms 15 and 16 of the supporting yoke. Ball bearings 38 suitably disposed between the bearing races 36 and 37 assure free rotation of the stub shafts upon the yoke arms. Fixed to the inner ends of the stub shafts 32 and 33 and seated against the inner shoulders formed by the enlarged central portions 34 and 35 thereof are a pair of circular plates 39 and 40. Nuts 41 and 42 are threaded upon the inner ends of the stub shafts against against the inner faces of the plates 39 and 40 for effectually precluding any lateral displacement of the plates from their supporting shafts. The enlarged central portions 34 and 35 of the stub shafts are of sufficient thickness to provide substantial clearances between the plates 39 and 40 and the yoke arms 15 and 16, respectively.

Rotatably mounted in the supporting yoke arm 15 immediately above the stub shaft 32 is an inwardly extending pinion 43 operable by the handle 44. This pinion 43 is geared to the stub shaft 32, the enlarged central portion 34 of the latter being provided with teeth 45 for this purpose. Plates 39 and 40, being interconnected by a plurality of transversely extending strap members 46, it will thus be seen that upon operating the handle 44 a rotative movement will be imparted to the plates 39 and 40 as a unit.

The straps 46 which interconnect the plates 39 and 40 are in turn tied together by a plurality of intermediately disposed straps 47 arranged at right angles thereto. These straps 47 are arranged in pairs lying in spaced parallel planes at right angles to the plates 39 and 40. Supported between these pairs of strap members 47 is the transformer 10 from which depend the secondary leads 48 and 49. Secured to the outer faces of the front pair of strap members 47 by means of the bolts 50 are a pair of substantially channel shaped members 51, the base walls 52 of which are spaced forwardly from the respective strap members 47 to which the members 51 are secured. Interconnecting the forward pair of strap members 47 at a point immediately above the upper ends of the channel members 51 is a transversely extending member 52′, and secured to the extreme upper ends of these same strap members 47 are a pair of angle members 53, the freely extending branches 54 of which extend forwardly and downwardly to support the controlling rheostat indicated generally by the reference numeral 11.

Secured to the outer faces of the base walls 52 of the channel members 51 is an apertured plate 55 upon which is detachably secured by means of the bolts 56 an annular collar 57 for maintaining in position a bifurcated bearing member 58 in which is journaled the crank arm 59. This crank arm 59 is in turn connected to the forward end of a short rod or stem 60 by means of the link 61 and the actuating arm 14, upon which is mounted the switch mechanism 15, is fixed to the crank arm shaft such that upon actuation of the arm 14 the crank arm may be rocked an amount sufficient to pull the stem 60 forwardly—that is, in a direction away from the forward end of the transformer 10.

Figure 2:
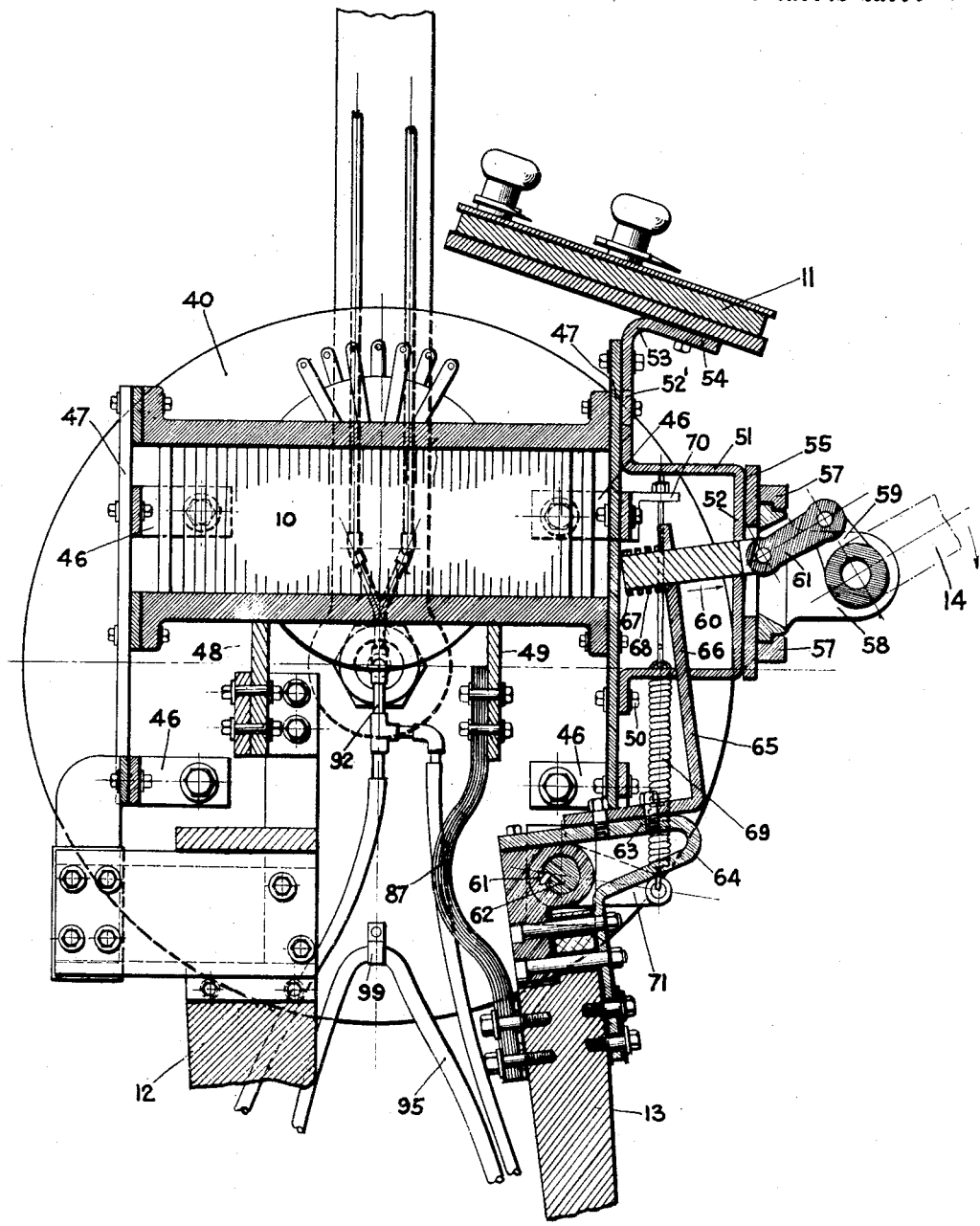
Figure 2 is a cross sectional view of the central portion of the machine taken at right angles to Figure 1.

As is most clearly shown in Figure 2, it will be seen that the movable electrode supporting arm 13 has its upper end keyed, as at 61, to a shaft 62 rotatably supported in bearing bosses provided on the plates 39 and 40. Fixed to the upper end of this electrode supporting arm 13 is a member indicated generally by the reference numeral 63, this latter member being provided with a forwardly extending looped portion 64 to the upper surface of which is secured a substantially L shaped member 65. The longer branch 66 of this L shaped member 65 extends vertically above the forwardly extending portion 64 of the member 63 and is provided with an opening in its upper end through which is projected the rod or stem 60. This rod or stem 60 is provided with an enlarged head 67 at its rear end, constituting the rear abutment for the compression spring 68 which surrounds that portion of the stem 60 extending rearwardly of the arm 66 of the member 65. The L shaped member 65 and the member 63 to which the shorter arm thereof is secured jointly constitute what is in effect a bell crank interconnecting the rod or stem 60 and the electrode supporting arm 13 which is keyed to the shaft 62. By this arrangement, it will be seen that upon actuation of the main actuating arm 14, the rod or stem 60 will be drawn forwardly an extent sufficient to overcome the compressive force of the spring 68, with the result that the arm 66 of the bell crank member 65 will be actuated to impart a partial rotation to the shaft 62 to which is secured the electrode supporting arm 13.

In order to maintain the electrode supporting arms 12 and 13 in normally separated position, there are provided a pair of spaced tension springs 69, the upper and lower ends of which are respectively secured to brackets 70 carried by one of the transversely extending straps 46 and to forwardly extending arms 71 carried by the shaft 62 to which the electrode supporting arm 13 is keyed.

Referring more particularly to Figures 3 and 7, it will be seen that the stub shaft 32 is provided with a horizontally extending bore 72 in which are arranged a pair of members 73 and 74, the former extending through a longitudinally extending bore provided in the latter. These members 73 and 74 are each provided with enlarged heads 75 and 76, respectively, constituting collector rings for supplying current to the primary circuit of the transformer 10. The inner ends of the members 73 and 74 are externally threaded, as at 77 and 78, respectively, and have secured thereto by means of the nuts 79 and 80 a pair of terminal members 81 and 82, respectively. Suitable brushes 83, preferably spring pressed, contact with the circumferential surfaces of the enlarged heads of the conductor elements 73 and 74, respectively, as the latter rotate with the stub shaft 32 when the handle 44 is operated. The leads 85 for supplying current to the brushes 83 from the source of supply pass through the vertically extending bore provided for this purpose in the supporting member 25, the primary circuit of the transformer being completed by leads running from the terminal members 81 and 82 to the transformer primary terminals, respectively. The current conducting elements 73, 74, 81 and 82 are suitably insulated from each other, and from the stub shaft in which they are mounted, in a manner well understood in the art, the insulation for this purpose being clearly shown in Figure 7. Similarly, the electrode supporting arm 13 is insulated from its supporting shaft 62 and the actuating mechanism therefor, as is most clearly illustrated in Figure 2.

Each of the electrode supporting arms 12 and 13 are provided at the lower ends with suitable electrodes 85 and 86, respectively, to which welding current is supplied from the secondary circuit of the transformer 10 through the depending terminals 48 and 49, the latter of which is connected to the electrode supporting arm 13 by the flexible connection 87.

In order to protect the electrodes 85 and 86 against the excessive heat which is developed during the course of the welding operations, there has been provided a system for circulating a cooling fluid through these electrodes. This system essentially consists of water or other cooling fluid tubes arranged to circulate the cooling fluid continuously and serially through the welding electrodes. The connection 88, leading from the water supply, continues to a two-way fitting 89 extending downwardly through the hollow stem 24, the circulating fluid passing through one of the passages in this fitting to the connection 90 which follows closely the inside face of the yoke arm 16, thence passing outwardly through an opening 91 in said arm for connection with a second two-way fitting 92 which extends transversely through the horizontal bore 93 of the stub shaft 33. The circulating fluid passes through one of the passage ways in this two-way fitting 93 and continues through the flexible connection 94 to and through the electrode 86, from whence it passes through the connection 95 into and through the second electrode 85, finally passing through the return connection 96 to the return passage of the two-way fitting 93. From this point, the circulating fluid completes its return through the connection 97, the return passage in the fitting 89 and the flexible connection 98. The flexible connection 95, which directly interconnects the electrodes 85 and 86, is supported out of the way of these welding electrodes by a clip 99, which is suitably secured upon the inner face of the plate 40 adjacent the peripheral edge thereof.

From the foregoing description, it will appear that a welding apparatus has been devised, which is capable of substantial (universal) adjustment with respect to the work to be welded. The welding machine proper, comprising the transformer 10, the welding arms, and the actuating mechanism for moving these arms to effect the desired spot welds, may be rotated about a substantially horizontal axis by manually operating the handle 44, while the pivotal arrangement between the supporting member 25 and the top of the supporting yoke of the machine proper permits movement of the latter about a substantially vertical axis. In order, however, to assure the maintenance of the welding machine in any desired fixed position with respect to its horizontal axis; that is, in order to insure a definite angular relation between the welding axis and the horizontal, there has been provided a brake mechanism such as is best shown in Figure 5.

This mechanism essentially consists of a brake shoe 100, substantially embracing the enlarged central portion 35 of the stub shaft 33, the ends 101 and 102 of the shoe terminating short of one another, and the end 102 being secured in any desired manner against rotation. A brake lining 103 may or may not be employed between the internal surface of the brake shoe 100 and the circumferential surface of the stub shaft 32 which it embraces. Secured to the inner surface of the plate 40 are a pair of spaced brackets 104 and 105, the latter of which constitutes the bearing for a stub shaft 106 journaled therein. Fixed to this stub shaft 106 is the bell crank lever 107, the longer arm of which constitutes the brake handle, and the shorter arm of which has pivotally connected to its free end one end of a link 108. The opposite end of this link 108 is in turn pivotally connected, as at 109, to a second link 110, this last mentioned link being provided with an off-set portion 111 having its free end pivotally connected, as at 112, to a longitudinal extension of the bracket 104. A short link 113 is pivotally connected, as at 114, to the off-set portion 111 of the link 110, and is provided at its free end with an outwardly projecting boss 115 projecting through the elongated slot 116 formed in the plate 40 opposite the free end of the brake shoe 100. The boss 115 is secured in any desired manner to this free end of the brake shoe. A tension spring 117 has its opposite ends secured respectively to the shaft 106 and to the link 110, thus constantly urging the latter toward the shaft with the result that the brake shoe 100 embraces tightly the stub shaft 33. In order to release the brake shoe from its engagement with the stub shaft 33, it is only necessary to depress or partially rotate the bell crank arm 107 upon its shaft 106 to force the link 110 against the action of the tension spring 117, with the result that the short link 113 produces an expansion of the brake shoe 100 to an extent sufficient to permit the free rotation of the welding machine proper by means of the operating handle 44. Upon releasing the brake arm 107, the brake shoe automatically re-sets by virtue of the action of the spring 117 to prevent any further rotation.

It is, of course, to be understood that the foregoing description has been primarily for the purpose of explaining the preferred principles and mode of operation of the new welding apparatus, and that considerable variations and changes may be made in the invention without departing from the spirit thereof as defined broadly and specifically in the appended claims.

What is claimed as new and useful is:

1. An electric welding apparatus comprising a pair of interconnected plate members, a transformer supported between said members, a pair of relatively movable electrode supporting arms connected to said transformer and extending beyond the peripheral edges of said plates, means for rotatably supporting said plates, transformer and arms as a unit, and means for imparting a rotative movement to said unit.

2. An electric welding apparatus including a unit comprising a pair of laterally spaced plate members, a transformer disposed therebetween, a pair of electrode supporting arms operatively associated with said transformer and an actuating arm for effecting relative movement between said arms, and means for imparting a rotative movement to said unit whereby to vary the angle between the welding axis of the electrodes and the horizontal.

3. An electric welding apparatus including a unit comprising a pair of interconnected side members, a transformer disposed between said members, a shaft rotatably supported by said members, an electrode supporting arm electrically connected and relatively stationary with respect to said transformer, a second electrode supporting arm electrically connected to said transformer, said latter arm being carried by said rotatable shaft, means for oscillating said shaft to bring said arms into working relation, and means tending normally to maintain said arms in inoperative position.

4. In an electric welding apparatus, in combination, an overhead support provided with depending arms, a stub shaft rotatably mounted in each arm of said support, a plate fixed to each shaft, said plates being each spaced from the inner surfaces of said depending arms and being interconnected for rotation together, means associated with one of said shafts for imparting a rotative movement to said plates, and means associated with the other of said shafts for preventing unintentional rotation of said plates.

5. In an electric welding apparatus, in combination, an overhead support provided with depending arms, a welding unit carried by said arms, a handle rotatably mounted in one of said arms and operatively associated with said unit for imparting a rotative movement thereto, and means operatively associated with the other of said arms and with said unit for maintaining the latter in adjusted position.

6. In an electric spot welding apparatus, a pair of spaced, interconnected plate members, horizontally aligned shafts upon which said members are respectively mounted, means for rotatably supporting said shafts, a transformer arranged between said plate members and rotatable therewith, an electrode supporting arm electrically connected to said transformer, said arm being also rotatable with said members, a transversely extending shaft rotatably supported between said members, and a second electrode supporting arm fixed to said transversely extending shaft and operable independently of said first-mentioned arm.

7. In an electric spot welding apparatus, a pair of spaced plate members, a plurality of transversely extending straps interconnecting said members, a transformer disposed between said members and carried by said straps, a transversely extending shaft rotatably supported between said members, an electrode supporting arm fixed to said shaft and electrically connected to the secondary of said transformer, means for imparting a rotative movement to said plate members, and means for oscillating said shaft independently of the rotation of said plate members.

In testimony whereof I hereunto affix my signature.

JOSEPH W. MEADOWCROFT.